Oct. 27, 1964    R. OHRNBERGER    3,153,814
INJECTION MOLDING MACHINE
Filed Jan. 2, 1963    6 Sheets-Sheet 1

FIG. 1

INVENTOR.
Robert Ohrnberger
BY Michael S. Striker,
Attorney

Oct. 27, 1964    R. OHRNBERGER    3,153,814
INJECTION MOLDING MACHINE
Filed Jan. 2, 1963    6 Sheets-Sheet 4

INVENTOR.
Robert Ohrnberger
BY~ Michael S. Striker,
Attorney

Oct. 27, 1964  R. OHRNBERGER  3,153,814
INJECTION MOLDING MACHINE
Filed Jan. 2, 1963  6 Sheets-Sheet 5

FIG. 6

INVENTOR.
Robert Ohrnberger
BY- Michael S. Striker,
Attorney

Oct. 27, 1964   R. OHRNBERGER   3,153,814
INJECTION MOLDING MACHINE
Filed Jan. 2, 1963   6 Sheets-Sheet 6

INVENTOR.
Robert Ohrnberger
BY~ Michael S. Striker,
Attorney

United States Patent Office 3,153,814
Patented Oct. 27, 1964

3,153,814
INJECTION MOLDING MACHINE
Robert Ohrnberger, Bad Homburg vor der Höhe, Germany, assignor to Vereinigte Werkzeugmaschinenfabriken Aktiengesellschaft, Frankfurt am Main, Germany
Filed Jan. 2, 1963, Ser. No. 249,095
Claims priority, application Germany, Jan. 5, 1962,
V 21,833
12 Claims. (Cl. 18—30)

The present invention relates to injection molding machines in general, and more particularly to an improved cooling arrangement for molds in such machines. Still more particularly, the invention relates to an automatic control system for cooling arrangements of injection molding machines of the type wherein tie rods connect two stationary supporting members and wherein such tie rods not only guide the movements of a movable die toward and away from a cooperating stationary die but also form part of the means which holds the dies against separation in the course of an injection molding operation.

It is well known that stresses developing in the course of an injection molding operation exert a great influence on the characteristics of molded articles. Thus, the magnitude and duration of pressures, the design and the thermal characteristics of the mold must be properly balanced if the ultimate product is to be one of optimum characteristics as regards its coloration, hardness, surface finish, elasticity and certain other factors. Such stresses which develop in the course of an injection molding operation also affect the component parts of the machine, particularly its clamping mechanism, the mechanism which reciprocates the movable die with respect to the stationary die, and the tie rods along which the movable die is reciprocated on its way to closing or idle position. As a rule, stresses developing during an injection molding operation are compound stresses consisting of stresses resulting from pressure which is applied to the closed mold, of stresses which develop in response to hardening of plastic material that was injected into the mold cavity, of stresses which develop in response to cooling or chilling of the mold, and certain others. It was found that the characteristics of the ultimate product are influenced less by individual stresses than by stresses which reflect the sum of superimposed and opposed stresses that develop in the course of an injection molding operation. In many instances, the combined effect of clamping pressure, of injection pressure and of cooling is most important in determining the characteristics of the molded articles, and such effect causes lesser or greater changes in the dimensions (i.e., in the length and cross section) of the tie rods.

Accordingly, it is an important object of the present invention to take advantage of the fact that the dimensions of tie rods will change in the course of an injection molding operation in a way to reflect the sum of stresses developing during such operation and to utilize such dimensional changes as a yardstick for regulating or adjusting the cooling action upon the mold in a way to insure that the ultimate product will be one of optimum characteristics.

Another object of the invention is to provide a novel control system which is constructed and assembled in such a way that it is capable of regulating or adjusting the cooling action upon the mold of an injection molding machine in dependency on changes in the length and/or cross section of the tie rods.

A further object of the invention is to provide a control system of the just outlined characteristics which is especially suited for controlling the temperature of molds in response to changes in the length of tie rods.

Still another object of the invention is to provide an injection molding machine wherein the cooling arrangement for the mold is regulated in dependency on changes in the length of the tie rods and which comprises a novel operative connection between one or more tie rods and one or more sections of the cooling arrangement.

A concomitant object of my invention is to provide a fully automatic control system of the above outlined characteristics which will regulate the cooling action upon the mold of an injection molding machine in such a way that the cooling action may be varied infinitely, in stepwise fashion, or that the cooling arrangement may be set to bring about a cooling action which is constant and which is satisfactory for a wide range of stresses.

With the above objects in view, the invention resides in the provision of an injection molding machine which comprises a mold including a plurality of cooperating dies which define a mold cavity for plastic material and which tend to become separated in the course of an injection molding operation, means for holding the dies against separation including at least one elongated tie rod which is subject to dimensional changes during such operation, and adjustable cooling arrangement for the mold, and control means operatively connected with the cooling arrangement and with the tie rod for adjusting the cooling arrangement in response to dimensional changes of the tie rod. The control means may be responsive to changes in length or in cross section of the tie rod, and it is often desirable to provide a cooling arrangement including a series of separate cooling circuits each of which regulates the temperature in a different section of the mold. In such instances, it may be necessary to provide a plurality of control means each of which adjusts one, two or more cooling circuits so that each section of the mold may be cooled independently of the other section or sections.

In accordance with a feature of the present invention, the cooling arrangement comprises adjustable valve means and the operative connection between such valve means and the tie rod or tie rods includes an electric circuit which adjusts the valve means in response to a reduction in the length of the respective tie rod. In other words, and assuming that the cooling arrangement is set to produce maximal cooling action at the time an injection molding operation is started and that, at such time, the length of the tie rods attains its maximal value, the control means will respond to a reduction in the length of the respective tie rod and will gradually, stepwise or otherwise reduce the cooling effect upon the mold in a predetermined relation to the shortening of the tie rod.

Of course, the cooling arrangement may also respond to a lengthening of tie rods so as to permit maximal cooling of the mold in response to maximal lengthening of a tie rod at the time the mold is closed and receives a supply of plastic material which is to assume the form of and which is to set in the mold cavity.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

Figure 1:
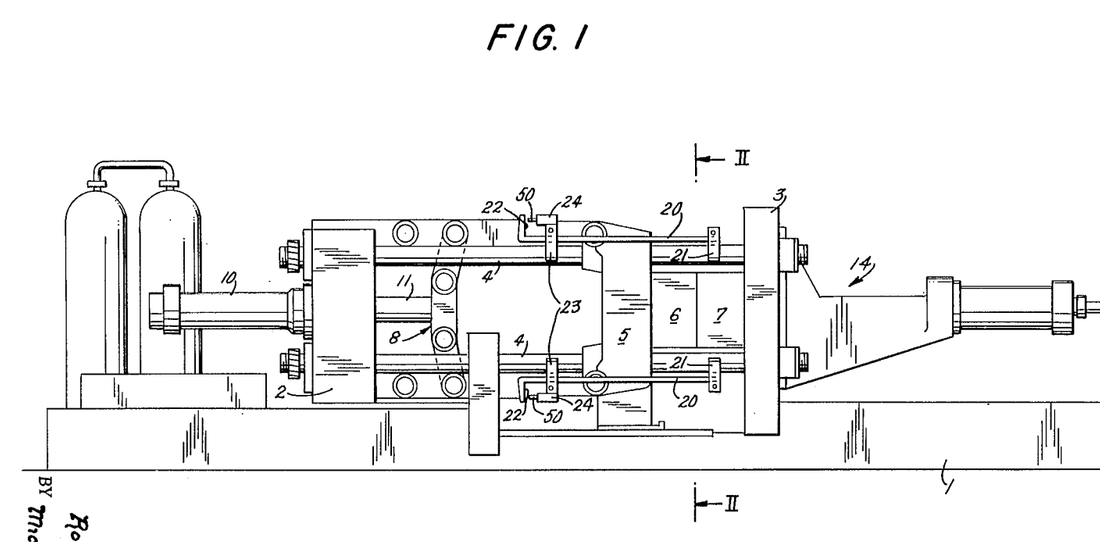
FIG. 1 is a schematic side elevational view of an injection molding machine which embodies one form of my control system and which is shown in operative position.

Referring now in greater detail to the drawings, and first to FIG. 1, there is shown an injection molding machine which comprises a base 1, a pair of stationary supporting members or platens 2, 3 which are spaced from each other and which are rigid with the base 1, four parallel elongated tie rods 4 whose end portions are secured to the supporting members 2, 3 and which guide a movable platen 5 for a reciprocable die 6, the latter cooperating with a second die 7 which is fixed to the stationary member 3. The machine further includes a clamping mechanism 8 which comprises a series of toggle links and which cooperates with the parts 1 to 5 to serve as a means for holding the compound mold 6, 7 in closed position. The clamping mechanism 8 operates between the stationary support 2 and the die 6 to hold this die against separation from the die 7 when the machine is in operation whereby stresses developing during such operation tend to change the dimensions of the tie rods. In addition, the clamping mechanism 8 serves to transmit to the platen 5 movements received from a reciprocating mechanism including a double-acting fluid-operated cylinder 10 fixed to the stationary member 2 and a piston 11 which is reciprocably received in the cylinder and which is coupled to the mechanism 8. The construction of this injection molding machine is well known in the art and by itself forms no part of my invention. The machine further comprises an injection mechanism 14 which is carried by the supporting member 3 and which injects requisite quantities of all kinds of injectable material into the mold cavity 9 (see FIG. 2) defined by the dies 6, 7 when these dies assume the position of FIG. 1.

The control system of my invention comprises a series of measuring devices or gauges which serve as a means for transmitting impulses in response to changes in the length of tie rods 4, i.e., in response to stresses developing during an injection molding operation. While it is often sufficient to provide a single gauge, the machine of FIG. 1 is equipped with four gauges each of which responds to changes in the length of a different tie rod 4. As shown, each gauge comprises an elongated bar 20 one end of which is fixed to a bracket 21 rigidly secured to the respective tie rod in such a way that it follows axial displacements of that particular rod portion to which it is connected. The bars 20 are parallel or nearly parallel with the longitudinal extensions of the respective tie rods and their free ends are provided with actuating means or trips 22 serving to actuate suitable devices which influence the cooling arrangement for the dies 6, 7. Each tie rod 4 further carries a second bracket 23 which is axially spaced from the associated bracket 20 and which serves the dual function of guiding the respective bar 20 and of carrying or supporting a regulating or adjusting device 24 which cooperates with the respective trip 22 when the tie rod is subjected to predetermined elongation or stretching at the time the machine of FIG. 1 carries out an injection molding operation. The setting of the regulating devices 24 and of the trips 22 is such that, when the tie rods 4 are not subjected to stretching forces, the regulating devices are inactive and that the trips 22 actuate the respective regulating devices in response to predetermined stretching of the tie rods. As a rule, each regulating device may control a separate circuit of the cooling arrangement in a manner as will be described in connection with FIG. 2, but it is equally possible to utilize each regulating device as a means for controlling the operation of two or more cooling circuits; for example, a single regulating device 24 may control the action of the entire cooling arrangement for the compound mold of an injection molding machine. However, when the configuration of the mold cavity 9 is rather complex and when the cooling arrangement includes several cooling circuits each of which controls the temperature of a different mold section, it is often preferred to provide a series of regulating devices each of which then controls one or more separate cooling circuits.

The distance between a pair of brackets 21, 23 mounted on a common tie rod 4 depends on the sensitivity of the regulating devices 24 and, in some instances, on the desired range of changes in elongation of tie rods which should control the cooling operation by varying the cooling effect proportionally with or in another relation to such elongation. Thus, if the operative connection between a regulating device 24 and the corresponding cooling circuit or circuits is such that the cooling circuits are merely turned on or off, it is sufficient to utilize regulating devices of average sensitivtiy. However, if each regulating device should change the cooling effect of the respective circuit or circuits in response to continuing changes in the length of the respective tie rod, the sensitivity of the regulating devices should be such that the regulating devices will be capable of a finite or infinite number of adjustments each of which then corresponds to a different setting of the respective cooling circuit or circuits.

Figure 2:
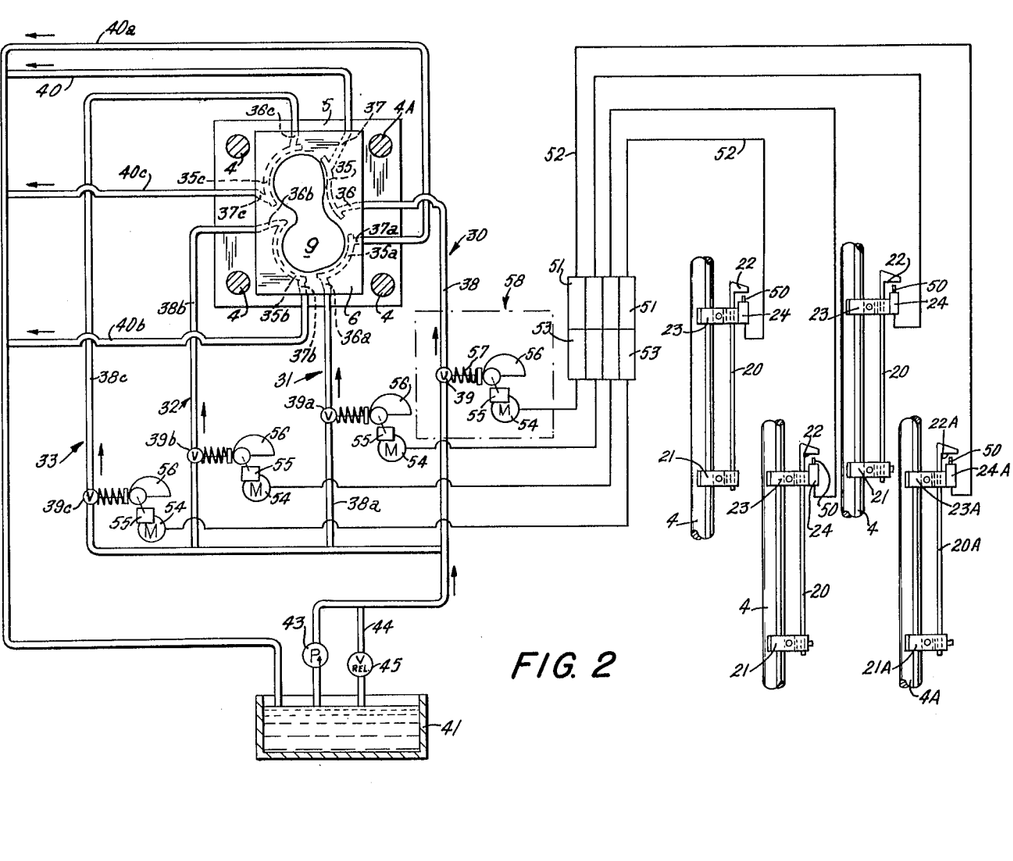
FIG. 2 is a schematic developed view of the control system and a fragmentary transverse section through the injection molding machine as seen in the direction of arrows from the line II—II of FIG. 1.

Referring to FIG. 2, it will be seen that the mold cavity 9 is of rather complicated form and, therefore, the mold including the dies 6 and 7 is preferably cooled by an arrangement which includes a plurality of independent cooling circuits 30, 31, 32, 33. Since the individual cooling circuits are of identical construction, it is sufficient to describe only one, for example, the circuit 30 which is adjusted in response to dimensional changes of the tie rod marked 4A in FIG. 2. This circuit includes an arcuate channel 35 which is formed in the die 6 adjacent to a certain section of the mold cavity 9, and inlet port 36 which is formed in the die 6 and which communicates with one end of the channel 35, a discharge port 37 which is formed in the die 6 and which communicates with the other end of the channel 35, a supply conduit 38 which is connected with the intake port 36 and which accommodates a motor-operated adjustable valve 39, and an evacuating conduit 40 which is connected with the discharge port 37 and which returns spent coolant to a source 41 of coolant or which discharges coolant to the atmosphere if the coolant is air or another gaseous medium. It is assumed that the coolant is a liquid substance which is stored in a source or tank 41 and which is drawn into the conduit 38 by a pump 43, there being a return line 44 which accommodates a pressure relief valve 45 and which returns coolant to the tank 41 if the pressure downstream of the pump 43 exceeds a permissible value. Conduits 38a, 38b, 38c which branch off the supply conduit 38 respectively lead to the intake ports 36a, 36b, 36c of the cooling circuits 31, 32 and 33. The evacuating conduits of the circuits 31, 32, 33 which are respectively connected with discharge ports 37a, 37b, 37c of channels 35a, 35b, 35c are identified by numerals 40a, 40b, 40c.

The regulating device 24a which is mounted on the bracket 23a of the tie rod 4a serves as an originator of signals to adjust the valve 39 in response to dimensional changes of this tie rod. This device 24a assumes the form of a commercial master potentiometer which includes a contact pin 50 located in the path of the trip 22A at the free end of the measuring bar 20A which is fixed to the bracket 21A.

In its simplest form, the control system of my invention may include regulating devices which merely indicate dimensional changes of the respective tie rods. In such instances, the regulating devices may assume the form of suitable dial gauges whose pointers are deflected from a starting position when the length or the cross section of the respective tie rod changes. The valves 39 are thereupon adjusted manually so that the cooling effect of the respective circuits is in a given relationship with the dimensional changes of the tie rods.

The control system of FIG. 2 operates differently in that the operative connection between each regulating device and the respective valve is fully automatic so that the valves need not be adjusted manually but are caused to change the rate of coolant flow as soon as the length of a tie rod between the respective brackets 21, 23 changes. The operative connection between the master potentiometer 24A and the valve 39 of the cooling circuit 30 comprises a second potentiometer 51 which is connected with the master potentiometer 24A by conductor means 52 and which controls a polarized relay 53 in the circuit of an electric motor 54. The motor 54 drives a transmission 55 whose output shaft carries a cam 56 cooperating with a spring-biased valve member 57 forming part of the valve 39 and regulating the flow of coolant through the supply conduit 38 in dependency on dimensional changes of the tie rod 4A. The parts 39, 57 and 54–56 together form a unit which is schematically indicated by phantom lines as at 58.

The unit 58, the relay 53, the potentiometers 24A, 51 and the bar 20A may be mounted externally on or within the tie rod 4A. It is also possible to mount these parts partly within, partly on and partly at a distance from the tie rod.

The operative connections between the regulating devices 24 of the other three tie rods and the valves 39a, 39b, 39c of the cooling circuits 31, 32, 33 are constructed in identical fashion and certain of their parts are indicated by identical reference numerals.

It will be readily understood that all of the cooling circuits need not be used to regulate the temperature of the die 6. Thus, it is possible to use one, two or three cooling circuits to regulate the temperature of the die 6 and to use the remaining cooling circuit or circuits for regulating the temperature of the die 7. It is also possible to use all of the circuits 30–33 for cooling of the die 7.

It goes without saying that the control system of FIG. 2 may be modified by utilizing only one tie rod for simultaneously adjusting the position of valves 39–39c, or by using two tie rods, each of which controls two cooling circuits. In certain instances, the number of cooling circuits must exceed the number of tie rods so that at least one tie rod must be connected with two or more cooling circuits. All such modifications are too obvious to require separate illustration.

Figure 3:
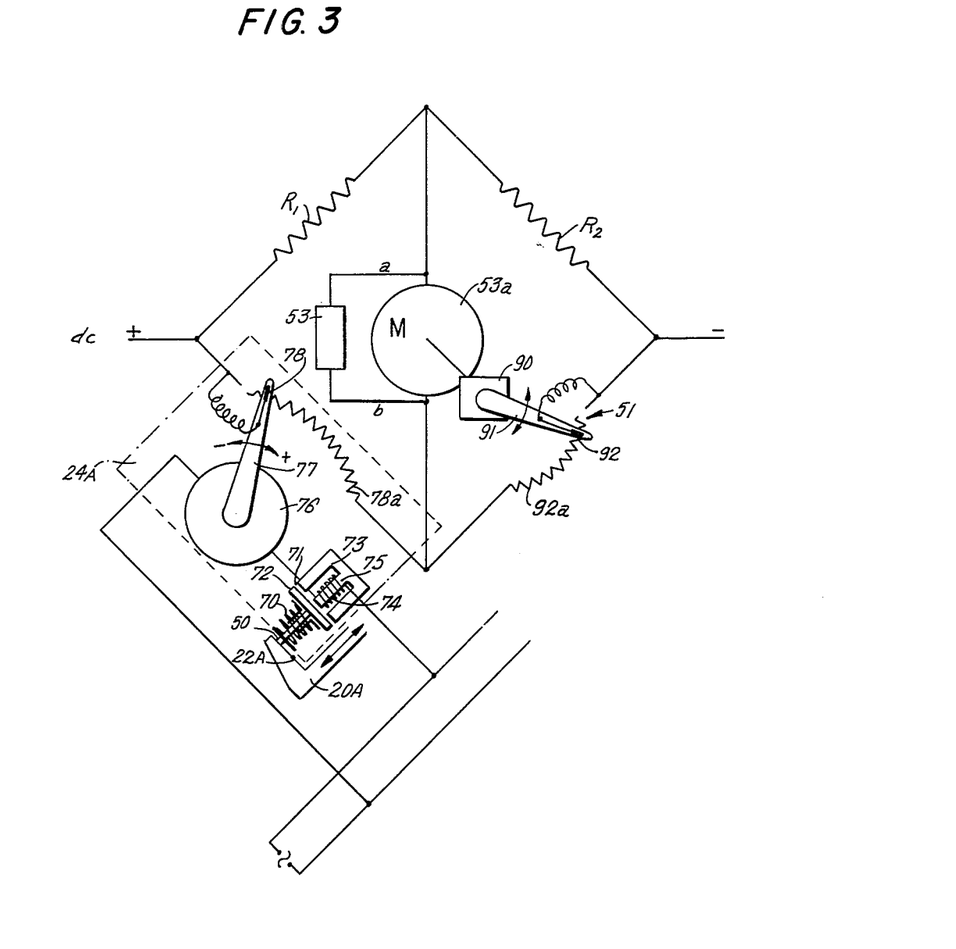
FIG. 3 is a diagrammatic view of an electric circuit which is embodied in the machine of FIG. 1.

FIG. 3 illustrates in greater detail an electric circuit which forms part of the control means and which provides an operative connection between the tie rod 4A and the valve 39 of the cooling circuit 30.

This electric circuit assumes the form of a bridge circuit with fixed resistors $R_1$ and $R_2$, with the master potentiometer 24A, with the secondary potentiometer 51 and with the polarized relay 53 which controls the motor 54 for the valve 39 and a Ferraris motor 53a. This motor 53a exhibits the tendency to balance the bridge.

The contact pin 50 is constantly biased against the trip 22A of the bar 20A by a spring 70. The axial position of the pin 50 will change in dependency on dimensional changes of the tie rod 4A to thereby vary the width of the gap 71 between a yoke 72 provided at one end of the pin 50 and a core 73. The central portion 74 of the core 73 carries a coil 75 which is connected to a source of alternating current, not shown. When the width of the gap 71 changes, the inductance of the coil 75 also changes to change the flow of current to a galvanometer 76. This galvanometer may be of the well-known moving iron type which turns a pointer 77 provided with a contact 78 which travels along the scale 78a of the master potentiometer 24A so as to unbalance the bridge circuit.

The motor 53a is now energized together with the polarized relay 53.

Figure 4:
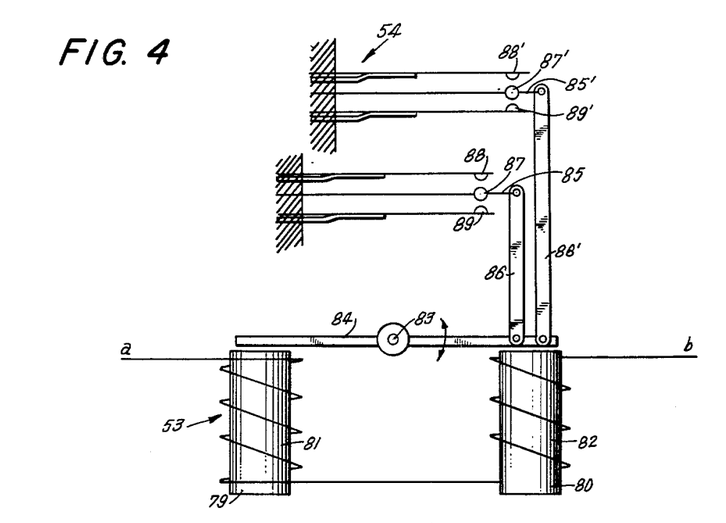
FIG. 4 is a diagrammatic view of a relay which is connected in the electric circuit of FIG. 3.

As shown in FIG. 4, the relay 53 comprises two cores 79, 80 whose coils 81, 82 are connected in series. At a point above the cores 79, 80, there is provided a yoke 84 which is pivotable about a pin 83 and which carries two connectors 86, 86' secured to a pair of contact springs 85, 85' which carry contacts 87, 87'. Depending on the direction in which the yoke 84 pivots about the pin 83, the contacts 87, 87' will respectively engage terminals 88, 89 and 88', 89' of the motor 54. Conductors a and b connect the coils 81, 82 with the diagonal of the bridge circuit shown in FIG. 3. The cores 79, 80 change their polarities if the direction of current flow through the coils 81, 82 changes whereby the contacts 87, 87' respectively engage the terminals 88, 88' or 89, 89' so that the direction of current flow to the motor 54 changes. Consequently, the motor 54 will rotate in a clockwise or in an anticlockwise direction, thus causing the transmission 55 to drive the respective cam 56 in a clockwise or anticlockwise direction and to thereby adjust the position of the valve 39.

As stated above, the Ferraris motor 53a is energized simultaneously with the relay 53 to drive a gear reducer 90 for a pointer 91. This pointer carries a contact 92 which is movable along the scale 92a of the potentiometer 51 and comes to rest when the bridge circuit is balanced.

If the length of the tie rod 4A changes again, the contact pin 50 changes its axial position to bring about a change in the angular position of the pointer 77 and to unbalance the circuit of FIG. 3. The above-described series of operations is then repeated as often as necessary until the plastic body in the mold cavity 9 is completely cooled.

Figure 5:
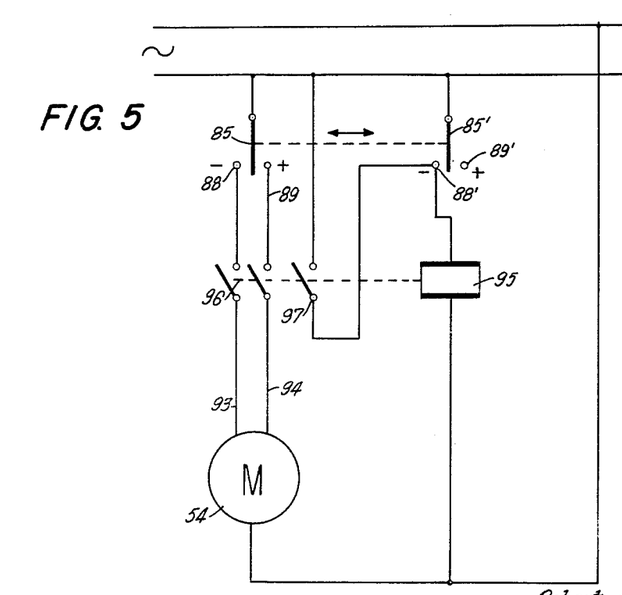
FIG. 5 is a diagrammatic view of a detail of the circuit shown in FIGS. 3 and 4.

At the time a plastic mass is being injected into the mold cavity 9, the tie rods are already subjected to dimensional changes, i.e., their length increases. Such dimensional changes may be measured by the circuit shown in FIG. 3 to be utilized for controlling and for limiting the clamping and blocking stresses which develop in the course of an injection molding operation. Consequently, it is normally desirable to keep the motors 54 idle until such time when the cooling step begins. If the injection molding operation takes a normal course, the motors 54 should be arrested during the period between the completion of the injecting step and the start of the controlled cooling step. The start of the cooling step may be determined and selected in the following way:

The tie rods are subjected to maximal stresses (and undergo maximal dimensional changes) at the time the mold is subjected to dynamic pressure toward the end of the injecting step. During the buildup of pressures toward a maximal pressure, dimensional changes of the tie rods are strictly unidirectional, namely, the length of the tie rods increases. Thus, the width of the gap 71 decreases continuously and the pointer 77 turns always in a clockwise (plus) direction, i.e., clockwise as viewed in FIG. 3. The springs 85, 85' of the polarized relay 53 move their respective contacts 87, 87' into engagement with the terminals 89, 89'. As shown in FIGS. 4 and 5, the conductors 93, 94 which supply current to the motor 54 remain disconnected from the current source if the length of the tie rods increases because the contact springs 85, 85' are then deflected in a positive direction and away from the terminals 88, 88'. However, once the pressure prevailing in the machine in the course of an injection molding operation has attained its maximum value and begins to decrease, the length of the tie rods also decreases so that the gap 71 widens and that the pointer 77 begins to travel in the opposite direction (anticlockwise, as viewed in FIG. 3) so that, for the first time, the springs 85, 85' are deflected to the negative side and move their contacts 87, 87' into engagement with the terminals 88, 88', respectively. The spring 85' then completes the circuit of a relay 95 which becomes energized and whose armatures 96, 97 then complete the circuit of the motor 54 which is now energized and adjusts the valve 39. The relay 95 comprises a holding circuit which keeps it energized for the duration of the cooling cycle so that the motor 54 remains operative and drives the cam 56 in a clockwise or anticlockwise direction, depending on the deflection and direction of the pointer 77 (i.e., depending on the widening or narrowing of the gap 71).

It will be readily understood that the cooling cycle may be started in another way, that is, not by the relay 95. For example, the piston of the injecting mechanism 14 may close a switch which completes the circuit of the motor 54, or the latter may be started by a clock or a similar timer device.

In the event that the length of the tie rods should temporarily increase during the actual cooling cycle, the control system follows such dimensional changes and causes the valve 39 to permit more fluid to enter the respective section of the mold. In other words, if the dimensional changes of the tie rods fluctuate, the movements of the valve members 57 are not unidirectional because such valve members then move back and forth, depending on the direction in which the motors 54 rotate.

Figure 6:
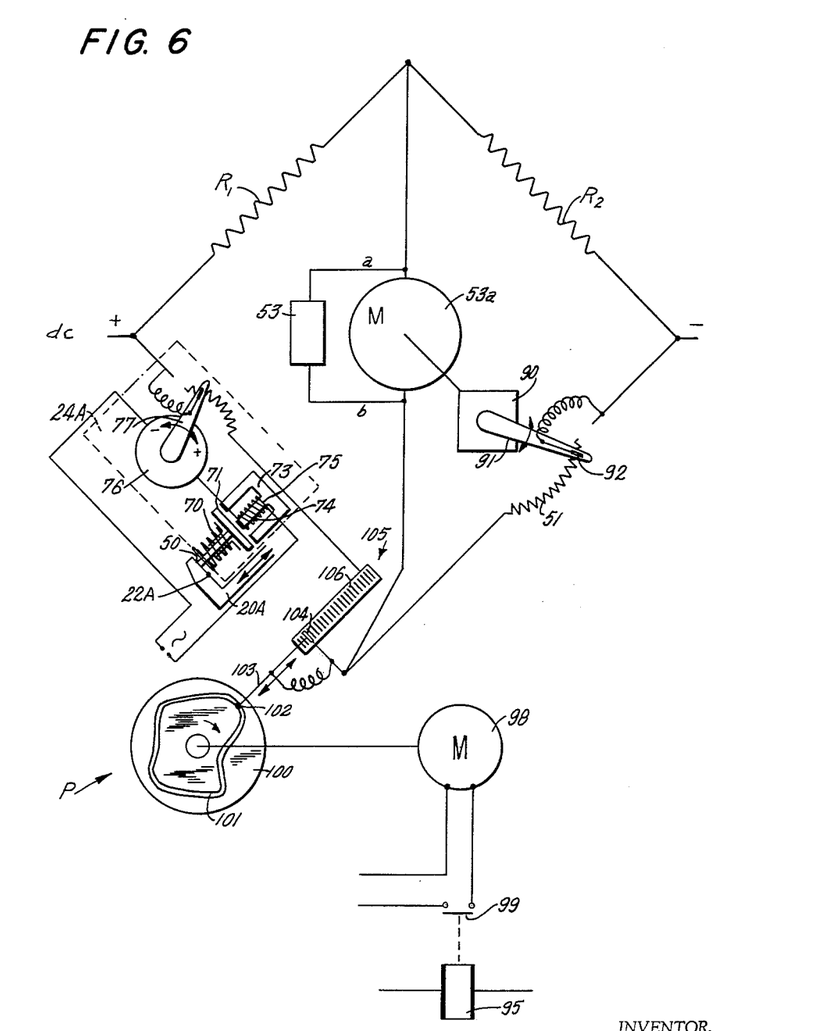
FIG. 6 is a diagrammatic view of a different electric circuit.

FIG. 6 shows a modified bridge circuit which comprises a programming circuit P whose function is to complement the action of the master potentiometer 24A by regulating the cooling cycle in a predetermined sequence which need not be directly related with dimensional changes of the tie rods. Such programming circuit is necessary in the event that, by cooling in a certain way, one desires to impart to the molded article certain specific characteristics as regards its surface finish, surface hardness, more rapid cooling in one zone than in the other zone or zones, etc. Thus, the programming circuit of FIG. 6 may be utilized whenever the bridge circuit of FIGS. 3–5 is not sufficient to control the cooling cycle in a desired manner, i.e., when the cooling action upon the material contained in the mold cavity should be regulated not only in dependency on dimensional changes of the tie rods but in another way which will cause the product to exhibit certain specific characteristics. Of course, similar results can be achieved by utilizing specially configurated cams 56 which control the valves 39–39c. Such special cams may regulate the cooling action independently of variations in the length of the tie rods or, alternatively, dimensional changes of the tie rods may be utilized to start the motors 54 whereupon the motors rotate at constant speed and the cooling action depends solely upon the configuration of the cams 56.

The circuit of FIG. 6 differentiates from the one shown in FIG. 3 merely in that it comprises a programming circuit P. This programming circuit comprises a motor 98 whose circuit may be completed by the armature 99 of a relay 95', the latter corresponding to the relay 95 of FIG. 5 but having an additional armature (99) for the motor 98. Thus, the motor 98 is started simultaneously with the motor 54 and drives a plate cam 100 whose cam groove 101 receives a follower 102. This follower is fixed to one end of a rod 103 which constitutes the points of a potentiometer 105 and whose contact 104 slides along a scale 106 connected in the branch of the main potentiometer 24A. The potentiometers 24A, 105 are thus connected in series. The impulses transmitted to the motor 54 through the master potentiometer 24A in response to dimensional changes of the tie rod 4A are modified by impulses transmitted by the programming circuit P so that the curve indicative of the cooling effect of the cooling circuit 30 need not be a straight line but may assume a sinusoidal or other shape. As stated hereinabove, similar results can be obtained if the cams 56 are replaced by differently configurated cams.

The valve 39 of the cooling circuit 30 is normally fully open when a supply of plastic material is injected into the mold cavity 9 and when the clamping mechanism 8 prevents separation of the dies 6 and 7. Consequently, the circuit 30 normally subjects the mold 6, 7 to maximum cooling action immediately upon completion of the injecting step and, when the control means includes the circuit of FIGS. 3–5, such cooling action decreases proportionally with the shortening of the tie rods which latter, quite obviously, have undergone maximal dimensional changes during the injection of all kind of injectable material into the mold cavity, particularly in the last stage of the injecting step. When the distance between the brackets 21A, 23A on the tie rod 4A begins to decrease, the main potentiometer 24A sends an appropriate impulse to the secondary potentiometer 51 and through the relay 53 causes the valve 39 of the circuit 30 to throttle the flow of coolant into the channel 35. Such throttling progresses with decreasing distance between the brackets 21A, 23A and the valve 39 finally shuts off the channel 35 from the pressure side of the pump 43 when the plastic article in the mold cavity 9 is ready to be removed from the mold.

The master potentiometer 24A is preferably mounted in such a way that it may be readily disconnected from the electric circuit in order to be replaced by a master potentiometer of different characteristics so that the rate of coolant flow into the channel 35 may be regulated in accordance with another characteristic curve. Thus, the potentiometer 24A may be of the type shown in FIG. 3 which will cause gradual throttling of the supply conduit 38 in direct proportion to progressive reduction in the distance between the brackets 21A, 23A so that the characteristic curve of such throttling action is a straight line. On the other hand, it is equally possible to use a master potentiometer which will control the respective motor 54 in a way known as cascade control.

It will be seen that the control system may transmit impulses to and may adjust the effect of the cooling circuits at a rate directly proportional to dimensional changes of one or more tie rods, or that the control system may transmit impulses independently of changes in the dimensions of the tie rods once such changes have set the control system in operation. In certain instances, the cooling circuits are adjusted only once to permit constant flow of coolant into the respective channels and the coolant is shut off after a predetermined period of time. In such instances, the tie rods merely start the control system whereupon the electric circuits automatically adjust the respective valves.

Figure 7:
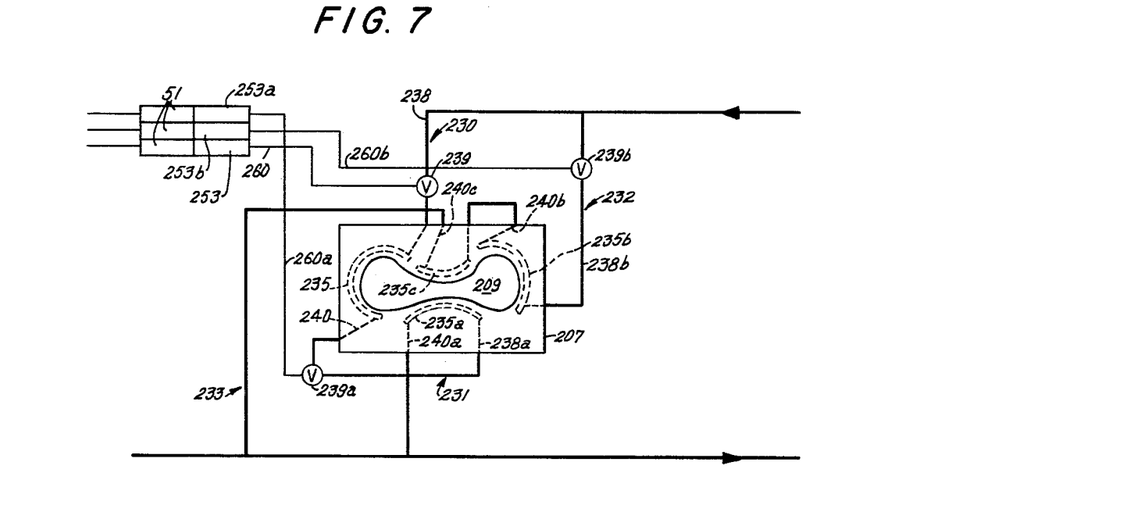
FIG. 7 is a schematic developed view of a different cooling arrangement.

In FIG. 2, the cooling circuits 30–33 are connected in parallel. FIG. 7 illustrates a different cooling arrangement wherein certain cooling circuits are connected in parallel and wherein certain circuits are connected in series. The cooling circuit 230 comprises a supply conduit 238, an evacuating conduit 240, a channel 235 in the die 207 and a valve 239 in the conduit 238. The evacuating conduit 240 leads to a valve 239a of the second cooling circuit 231 whose supply conduit 238a receives preheated coolant from the conduit 240 and admits such preheated coolant to a channel 235a whence the coolant flows into an evacuating conduit 240a. The die 207 defines a portion of the mold cavity 209.

The third coolant circuit 232 comprises a supply conduit 238b containing a valve 239b and leading to a channel 235b which communicates with an evacuating conduit 240b. The conduit 240b simultaneously constitutes the supply conduit of the fourth cooling circuit 233 which includes a channel 235c and an evacuating conduit 240c.

It will be noted that the cooling circuits 230, 232 are connected in parallel, that the cooling circuit 230 is connected in series with the cooling circuit 231, and that the cooling circuit 232 is also connected in series with the cooling circuit 233. The motors which operate the valves 239, 239a, 239b are not shown in FIG. 5, and the conductors 260, 260a respectively indicate that these valves are adjusted by separate relays 253, 253a, 253b each of which is energized in response to changes in length of a different tie rod. Thus, if the injection molding machine comprises four tie rods, only three such tie rods are operatively connected with the cooling arrangement of FIG. 7.

Figure 8:
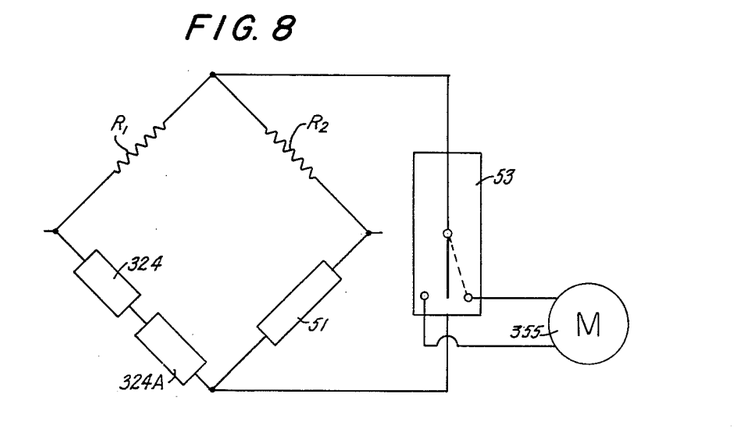
FIG. 8 is a diagrammatic view of a further electric circuit.

FIG. 8 shows another bridge circuit wherein one branch contains two regulating devices 324, 324A which are connected in series and each of which cooperates with a different tie rod. The impulses generated by the devices 324, 324A are transmitted to a motor 355 which operates the valve of a selected cooling circuit. Thus, in this embodiment of my invention, the cooling circuit which includes the motor 355 is adjusted in response to changes in length of two tie rods.

Finally, the changes in dimensions of tie rods may be utilized to regulate not only the temperature of the mold but also for other purposes such as shutting off the entire injection molding machine in response to a predetermined lengthening of tie rods or controlling the distribution of stresses to the tie rods. It is well known that the mold will close properly only if the distribution of stresses to all of the tie rods is uniform and, therefore, if the operators detect that the elongation of a given tie rod exceeds the elongation of the other tie rods, the machine must be adjusted to avoid such unequal distribution of loads. For example, and as explained hereinbefore, each regulating device 24 may comprise a dial which indicates the extent to which the tie rods are lengthened in the course of an injection molding operation.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention, therefore, such adaptations should and are intended to be comprehended within the meaning and range of equivalence of the following claims.

What is claimed as new and desired to be secured by Letters Patent is:

1. In an injection molding machine, in combination, a mold comprising a plurality of cooperating dies which define a mold cavity for all kind of injectable material and which tend to become separated in the course of an injection molding operation; means for holding said dies against separation including an elongated tie rod which is subject to dimensional changes during such operation; an adjustable cooling arrangement for said mold; and control means operatively connected with said cooling arrangement and with said tie rod for adjusting the cooling arrangement in response to dimensional changes of the tie rod.

2. In an injection molding machine, in combination, a pair of spaced supporting members; an elongated tie rod extending between and having end portions fixed to said supporting members; a mold comprising a first die fixed to one of said supporting members and a second die movable in the longitudinal direction of said tie rod toward and away from said first die, said dies cooperating to define a mold cavity for all kind of injectable material and said second die tending to move away from said first die in the course of an injection molding operation; a clamping mechanism operating between said second die and the other supporting member for pressing said second die against said first die whereby stresses developing during molding tend to change the dimensions of said tie rod; an adjustable cooling arrangement for said mold; and control means operatively connected with said cooling arrangement and with said tie rod for adjusting the cooling arrangement in response to dimensional changes of the tie rod.

3. In an injection molding machine, in combination, a pair of spaced supporting members; an elongated tie rod extending between and having end portions fixed to said supporting members; a mold comprising a first die fixed to one of said supporting members and a second die movable in the longitudinal direction of said tie rod toward and away from said first die, said dies cooperating to define a mold cavity for injectable material and said second die tending to move away from said first die in the course of an injection molding operation; a clamping mechanism operating between said second die and the other supporting member for pressing said second die against said first die whereby stresses developing during molding change the length of said tie rod; an adjustable cooling arrangement for said mold; and control means operatively connected with said cooling arrangement and with said tie rod for adjusting the cooling arrangement in response to changes in length of the tie rod.

4. In an injection molding machine, in combination, a pair of spaced supporting members; a first and a second elongated tie rod, said tie rods being parallel with each other and extending between and having end portions fixed to said supporting members; a mold comprising a first die fixed to one of said supporting members and a second die guided by and movable in the longitudinal direction of said tie rods towards and away from said first die, said dies cooperating to define a mold cavity for plastic material and said second die tending to move away from said first die in the course of an injection molding operation; a clamping mechanism operating between said second die and the other supporting member for pressing said second die against said first die whereby stresses developing during molding tend to change the dimensions of said tie rods; a cooling arrangement including a first and a second cooling circuit for controlling the temperature of different sections of said mold; and control means including a first and a second regulating device each operatively connected with one of said tie rods and with one of said cooling circuits for adjusting the circuits in response to dimensional changes of the respective tie rods.

5. A combination as set forth in claim 4, wherein said cooling circuits are connected in parallel.

6. A combination as set forth in claim 4, wherein said cooling circuits are connected in series.

7. In an injection molding machine, in combination, a pair of spaced supporting members; an elongated tie rod having end portions fixed to said supporting members; a mold comprising a first die fixed to one of said supporting members and a second die guided by and movable in the longitudinal direction of said tie rod toward and away from said first die, said dies cooperating to define a mold cavity for plastic material and said second die tending to move away from said first die in the course of an injection molding operation; a clamping mechanism operating between said second die and the other supporting member for pressing said second die against said first die whereby stresses developing during molding tend to change the dimensions of said tie rod; a cooling arrangement including a first and a second cooling circuit for controlling the temperature of different sections of said mold; and control means including a regulating device operatively connected with said tie rod and with said cooling circuits for adjusting the circuits in response to dimensional changes of the tie rod.

8. In an injection molding machine, in combination, a mold comprising a plurality of cooperating dies which define a mold cavity for plastic material and which tend to become separated in the course of an injection molding operation; means for holding said dies against separation including an elongated tie rod which is subject to dimensional changes during such operation; an adjustable cooling arrangement for said mold; and control means operatively connected with said cooling arrangement and with said tie rod for adjusting the cooling arrangement in response to dimensional changes of the tie rod, said control means comprising an elongated bar having a first portion fixed to said tie rod and a second portion spaced from said first portion, an impulse transmitting regulating device fixed to said tie rod and spaced from the front portion of said bar, said regulating device being located in the path of the second portion of said bar so that, when the length of said tie rod changes in response to stresses developing in the course of a molding operation, the second portion of said bar actuates said regulating device and the latter transmits impulses to said cooling arrangement.

9. In an injection molding machine, in combination, a mold comprising a plurality of cooperating dies which define a mold cavity for plastic material and which tend to become separated in the course of an injection molding operation; means for holding said dies against separation including an elongated tie rod which is subject to dimensional changes during such operation; a cooling arrangement including at least one cooling circuit having channel means formed in said mold, supply conduit means for admitting a coolant into said channel means, discharge conduit means for evacuating spent coolant from said channel means, and adjustable valve means in said supply conduit means for throttling the flow of coolant to said channel means; and control means operatively connected with said valve means and with said tie rod for adjusting said valve means in response to dimensional changes of said tie rod.

10. A combination as set forth in claim 9, wherein said control means is responsive to changes in length of said tie rod.

11. A combination as set forth in claim 9, wherein the operative connection between said valve means and said control means comprises an electric motor, transmission means driven by said motor, and a cam driven by said transmission, said valve means comprising a valve member engaging with and movable by said cam in response to operation of said motor.

12. A combination as set forth in claim 9, wherein said cooling arrangement comprises a plurality of cooling circuits and wherein the channel means of said cooling circuits are provided in one of said dies.

References Cited in the file of this patent

UNITED STATES PATENTS

| | | |
|---|---|---|
| 1,630,305 | Norwood | May 31, 1927 |
| 2,355,613 | Wacker | Aug. 15, 1944 |
| 2,790,204 | Edwards et al. | Apr. 30, 1957 |